US006583770B1

(12) United States Patent
Antila et al.

(10) Patent No.: US 6,583,770 B1
(45) Date of Patent: *Jun. 24, 2003

(54) DUAL DISPLAY ARRANGEMENT AND A TERMINAL DEVICE

(75) Inventors: Mika Antila, Tampere (FI); Risto Rönkkä, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,298

(22) Filed: May 13, 1998

(30) Foreign Application Priority Data

May 26, 1997 (FI) .................................................. 972213

(51) Int. Cl.7 ................................................. G09G 5/00
(52) U.S. Cl. ........................... 345/1.1; 345/1.2; 345/3.1
(58) Field of Search ........................ 345/1.1, 3.1, 173, 345/1.2, 1.3, 2.2; 178/18.06; 704/3; 455/556, 550, 90; 708/109

(56) References Cited

U.S. PATENT DOCUMENTS

| 4,611,897 | A | * | 9/1986 | Hara et al. .................... 354/475 |
| 4,720,781 | A | * | 1/1988 | Crossland et al. ........... 364/200 |
| 4,794,390 | A | * | 12/1988 | Lippman ..................... 340/756 |
| 5,016,002 | A | | 5/1991 | Levanto ...................... 340/756 |
| 5,049,862 | A | * | 9/1991 | Dao et al. .................... 340/706 |
| 5,189,632 | A | * | 2/1993 | Paajanen et al. ........ 364/705.05 |
| 5,337,346 | A | * | 8/1994 | Uchikura ..................... 379/58 |
| 5,467,102 | A | * | 11/1995 | Kuno et al. .................... 345/1 |
| 5,584,054 | A | * | 12/1996 | Tyneski et al. ................ 455/89 |
| 5,653,522 | A | * | 8/1997 | Loucks ........................ 353/122 |
| 5,657,370 | A | * | 8/1997 | Tsugane et al. ............. 455/550 |
| 5,687,939 | A | * | 11/1997 | Moscovitch ............. 248/122.1 |
| 5,706,068 | A | * | 1/1998 | Abileah et al. ............. 349/120 |
| 5,742,894 | A | * | 4/1998 | Jambhekar et al. ........... 455/90 |
| 5,835,458 | A | * | 11/1998 | Bischel et al. ........... 369/44.12 |
| 5,854,997 | A | * | 12/1998 | Sukeda et al. .................. 704/3 |
| 5,859,623 | A | * | 1/1999 | Meyn et al. .................... 345/1 |
| 5,896,575 | A | * | 4/1999 | Higginbotham et al. ..... 455/566 |
| 5,929,834 | A | * | 7/1999 | Inoue et al. ................. 345/104 |
| 5,949,643 | A | * | 9/1999 | Batio ......................... 361/681 |
| 5,977,934 | A | * | 11/1999 | Wada et al. .................... 345/3 |
| 5,995,175 | A | * | 11/1999 | Kim et al. .................... 349/43 |
| 6,014,573 | A | * | 1/2000 | Lehtonen et al. ........... 455/569 |
| 6,047,196 | A | * | 4/2000 | Makela et al. .............. 455/556 |
| 6,073,034 | A | * | 6/2000 | Jacobsen et al. ............ 455/566 |
| 6,144,358 | A | * | 11/2000 | Narayanaswamy et al. . 345/102 |
| 6,327,482 | B1 | * | 12/2001 | Miyashita .................... 455/566 |

FOREIGN PATENT DOCUMENTS

| GB | 2 074 356 A | 10/1981 |
| GB | 2 305 532 A | 4/1997 |

* cited by examiner

Primary Examiner—Vijay Shankar
(74) Attorney, Agent, or Firm—Perman & Green, LLP

(57) ABSTRACT

A display arrangement displays in two different directions and includes a first display (D1) displaying in a first direction and a second display (D2) displaying in a second, essentially opposite direction. The display arrangement comprises a component common to the first (D1) and second (D2) display, which component comprises a display material layer (2', 2", 8', 8", 14) of a certain size which determines the type of the display, and a first part (2', 8', 14) of the display material layer forms a part of the first display (D1) and a second part (2", 8", 14) of the display material layer forms a part of the second display (D2).

22 Claims, 3 Drawing Sheets

DUAL DISPLAY ARRANGEMENT AND A TERMINAL DEVICE

FIELD OF THE INVENTION

The present invention relates to a display arrangement with display to two directions comprising a first display displaying to a first direction and a second display displaying to an essentially opposite second direction. The invention also relates to a terminal device comprising such a display arrangement.

BACKGROUND OF THE INVENTION

Liquid crystal displays (LCD, Liquid Crystal Display) are at present very common especially in small size devices. They are displays thin in construction, consisting of transparent electrodes, a medium containing liquid crystals and polarization filters. One of the most common constructions is the so called twisted nematic (TN, Twisted Nematic) LCD-display. In it the molecules of a layer of liquid arranged between glass plates are directed in a desired direction using control voltages, at which the optical properties of the display elements change and create the desired pattern in the display.

FIG. 1 presents a cross section of the most commonly used twisted nematic liquid crystal display 12. Liquid crystal display 12 consists of transparent electrodes 3, liquid crystal layer 5 containing liquid crystal molecules 15 and polarization filters 1 and 9. Closest to the viewer (topmost in the figure) there is polarization filter 1, which is located on top of glass plate 2 protecting liquid crystal layer 5. Under glass plate 2 electrodes 3 (figures seen in the display) have been arranged using a conductive, transparent layer (for example indiumtinoxide, ITO). The glass plates can also be replaced with plastics, if a lighter and more robust construction is desired. The disadvantages of plastics are the high price and so far difficulties in manufacturing. A so called orientation layer 4 has been integrated on the surface of electrode 3. Liquid crystal molecules 15 in liquid crystal layer 5 which touch it are oriented and thus orient the whole liquid crystal layer 5 (the layer between orientation layers 4 and 6 containing liquid crystal molecules 15) in the desired way. On the other side of liquid crystal layer 5 there is orientation layer 6, and as next transparent electrode 7 alike electrode 3. The next layer is protective glass layer 8, in the bottom surface of which polarization filter 9 has been arranged. On the other side of polarization filter 9 there is reflector 10 which in the figure is reflecting light upwards.

The electric field controlling the display is arranged by connecting an electric field between display elements, or electrodes 3, arranged in a desired form, and electrode 7 using voltage supply 13 and switch 11. The operation of a liquid crystal display is based upon the fact that when there is no electric field in the display, light passes through layers 1–9 and is reflected back by reflector 10. In this case the background of the display seems light. When controlling control voltage 13 is connected between electrodes 3 and 7, the electric field generated by it twists liquid crystal molecules 15 in medium 5 in such a way that the light polarized using polarization filters 1 and 9 cannot pass through the construction but is absorbed in the construction. In this case the background of electrode 3 seems black. Different shades of darkness can be obtained by adjusting the control voltage level. The crossing of electrodes 3 and 7 forms a pixel. A multi-color liquid crystal display is manufactured by adding a color filter in each pixel. All colors can be produced with pixels provided with red, green and blue filters. In practice the color filter is a single layer, placed for example between lower glass plate 8 and electrode 7 (or between upper glass plate 2 and electrode 3), in which case the desired color is obtained when light is reflected upwards (in FIG. 1). The display can further be provided with a background light placed under reflector 10, in which case light passes through the reflector upwards in the figure and illuminates the display. The background light can be realized as an electroluminescense layer (a so-called EL-background light), which is illuminated when a voltage is brought over it.

Other kinds of prior known liquid crystal displays are a display based on dynamic scattering and a display based upon induced rotation (guest-host). Even if a liquid crystal display is flat and as such requires little space, space can be a problem in small size devices, such as mobile telephones, in which it is striven for devices with as small outer dimensions as possible and which are as light as possible. At present there are devices with several displays. An example of these is Nokia 9000 Communicator, with two displays opposite to each other, one display of the telephone section towards the outside of the device and a second display of computer/organizer section towards the inside of the device. The display of the telephone section is smaller and thus requires less surface area. Both displays however have the same thickness and they thus increase the thickness of the device when folded against each other. The situation has been illustrated in more detail in FIG. 2, in which telephone section display D1 is topmost with the viewing direction from top downwards in the figure, and in which computer/organizer section display D2 is lower with the viewing direction from bottom upwards in the figure. The structure of the displays has been simplified a little here. In telephone section display D1 there are top- and bottom polarizers 1' and 9', and glass plates 2' and 8', between which there is structure 14' (presented in FIG. 1 with reference 14), which has been omitted here because of simplicity, and reflector 10'. In computer/organizer section display D2 there are respectively top- and bottom polarizers 1" and 9", and the glass plates 2" and 8", between which there is structure 14" (presented in FIG. 1 with reference 14), which has been omitted here because of simplicity, and reflector 10". Displays D1 and D2 have been fixed in printed circuit boards PCB1 and PCB2, which in the device have been fixed to each other. In the printed circuit board it has preferably been fixed display driver circuits Dr' and Dr", which control the display (realizing the functions 11 and 13 in FIG. 1 for each pixel). The solution presented in FIG. 2 is vertically rather thick in the figure and thus significantly increases the size of the device in the direction in question. In a more advanced version of Nokia 9000 Communicator -device, which will be released in the summer of 1997, the construction has been made smaller by using only one printed circuit board and by fixing displays D1 and D2 on both sides of the printed circuit board.

SUMMARY OF THE INVENTION

Now a two-sided display element has been invented, by using which a display to two opposite directions can be realized and the thickness of said display construction can be reduced compared with previous solutions. In the invention the one and same display component or display material element is utilized in the realization of a first display displaying in a first direction and of a second display displaying in a second opposite direction. In this way a part of said display component (display material element) is used for the realizing of a first display displaying in a first direction and a second part of said component is utilized in the realization of a second display displaying in a second opposite direction. The common Display Material Element is preferably such a part of the display the direction of which as to the direction of viewing has no importance. Other parts (layers) of the display, the direction of which as to the direction of viewing has importance, are arranged in such a way that they are in the first and second display in reversed order and turned into opposite directions if required. The displays are formed next to each other displaying information to opposite directions.

The invention is particularly suitable for use in connection with a liquid crystal display, when both a first display displaying to a first direction and a second display displaying to a second, opposite direction are realized using the same liquid crystal layer and the same electrode layers.

Also other kinds of flat displays can be used in the realizing of the invention, at least as far as their structure is similar to that of a liquid crystal display, or comprises (when the cross section of the display is examined) in the middle a layer of display medium and on both sides of it electrodes (longitudinal and transverse conductors). The display medium layer usually defines the type of a display. Said display medium layer is for example in the case of a plasma display a gas (a layer of gas between the electrodes) and in the case of an electroluminescence display a semiconductor/phosphorus compound (a compound between the electrodes, usually ZnS:Mn).

In addition to a common display component flat displays often have layers, the order of which in the direction viewing has importance. At least a part of such layers are arranged for the first display on the same level with the in order same layer for the second display on the opposite side of the common display component. In this way it is obtained an approximately equally thick construction, in which the surface of a part of the element forms a first display displaying to a first direction and a second part of the element forms a second display displaying to a second opposite direction. In the case of a liquid crystal display such parts, the order of which as to the direction of viewing has importance, are polarizers and a reflector, when the upper polarizer, counted in the direction of viewing, of the first display is mounted on the same level with the lower polarizer and reflector of the second display and vice versa.

Preferably, a display element according to the invention is not fixed to any printed circuit board, but the driver circuits of the display can be fixed directly on (one of) the glass plates of the display for example using the chip-on-glass technique. The omitting of the printed circuit board further makes the construction thinner. Driver circuits are used to control the display element area in such a way that in the area of the first display the figures desired in the first display are obtained and in the area of the second display the figures desired in the second display are obtained.

The invention is characterized in that it comprises a component common to a first and a second display, the component comprising a display material layer of a certain size, and a first part of said display material layer forms a part of said first display and a second part of said display material layer forms a part of said second display.

BRIEF DESCRIPTION OF THE DRAWINGS

The invention is described in detail in the following with reference to enclosed figures, of which

DETAILED DESCRIPTION

Figure 1:
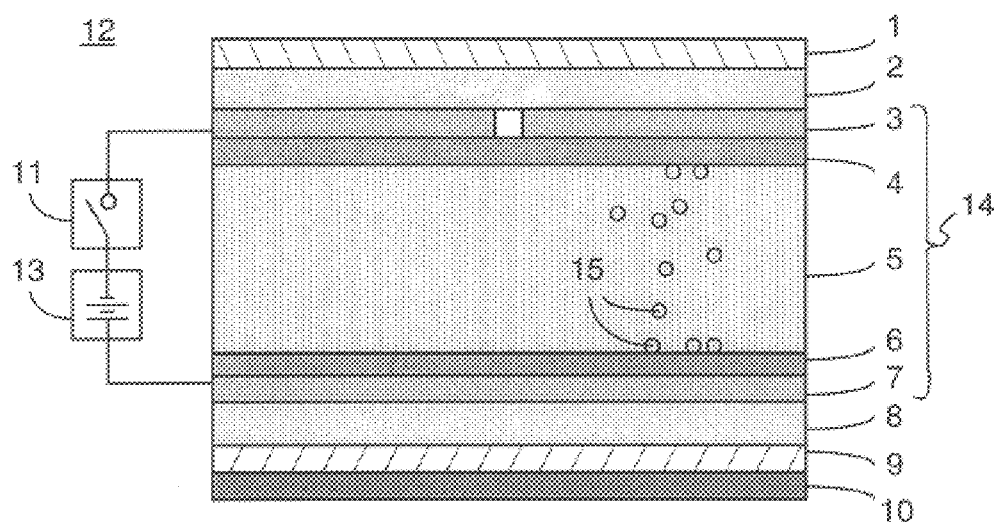
FIG. 1 presents the components and structure of an LCD-display (twisted nematic)
Figure 2:
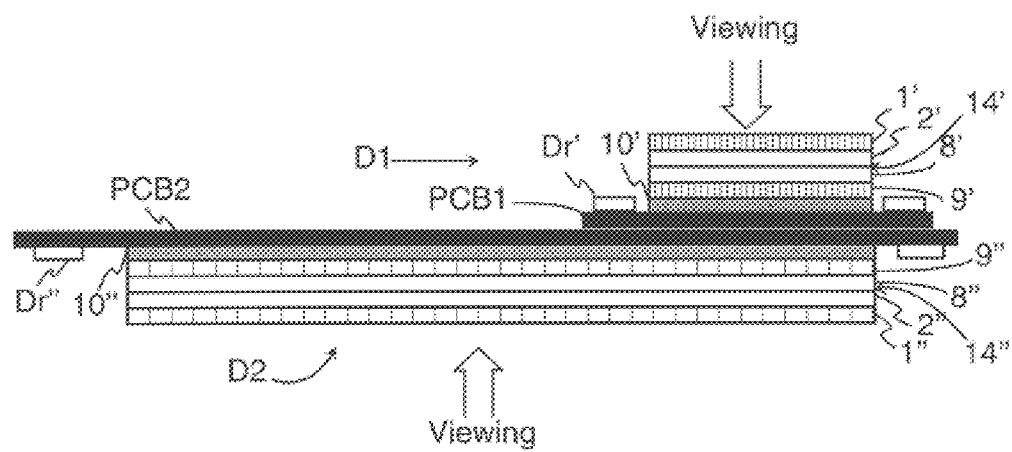
FIG. 2 presents a prior known solution for realizing a display displaying to two opposite directions.
Figure 3:
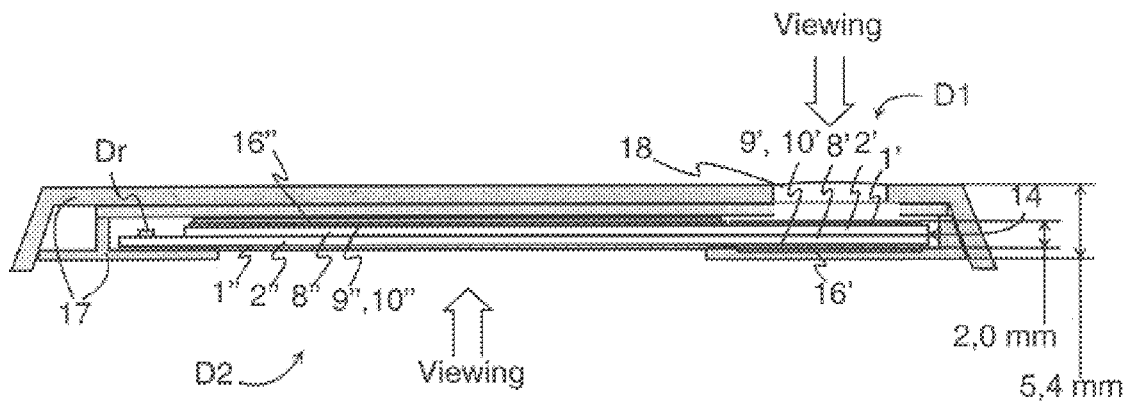
FIG. 3 presents an example of the realization of a display element according to the invention as a liquid crystal display.

FIG. 3 presents the realization of a double-sided display element according to the invention using a liquid crystal display as an example. Starting in the center of the construction it is almost similar to the construction of a normal liquid crystal display, i.e. it has two glass plates 2 and 8, between which there is at least liquid crystal 5, more accurately construction 14 presented in FIG. 1. The thickness of each glass plate is ca. 0.7 mm and the thickness of the liquid crystal between them is ca. 5 $\mu$m. Glass plates 2, 8 and liquid crystal construction 14 are common to both displays thus formed, i.e. to display D1 having the viewing direction from up in the figure and to display D2 having the viewing direction from below in the figure. For display D1 the upper glass plate in the figure thus forms, seen from the viewing direction, first glass plate 2' and the bottom glass plate forms second glass plate 8'. For display D2 the bottom glass plate in the figure thus forms, seen from the viewing direction, first glass plate 2", and the upper glass plate forms second glass plate 8".

The first layer of display D1 counted in the viewing direction is first polarizer 1', i.e. polarization filter 1'. On the same level in the construction there is for display D2 bottom (second) polarizer 9", i.e. polarization filter 9", and reflector 10" of display D2. First polarizer layer 1' of display D1 and second polarizer-reflector layer 9", 10" (polarizer 9" and reflector 10" form one layer entity) are both ca. 0.3 to 0.35 mm thick. In practice layers 1' and 9", 10" are separate pieces which are mounted/fixed next to each other on the same level (on the surface of a glass plate). The polarization levels of polarizers 1 and 9 also depend on liquid crystal material 14 used. In a twisted nematic (TN) liquid crystal display the polarization level of light twists as light passes through molecule layers, the direction of which is twisted. Normally the polarization level of light twists 90° in liquid crystal layer 5. In this case the polarization filters are often arranged in such a way that second polarizer 9 is at an 90° angle to first polarizer 1, and hence a correct polarization level is obtained for the light which has passed liquid crystal layer 5, hence all light (or a majority of the light) passes through second polarizer 9. Reflector 10 is preferably diffuse and maintains the polarization level, in which case the light passes back through second polarizer 9, passes through liquid crystal layer 5 and passes through first polarizer 1 in the places in which there is no electric field between electrodes, in which case the display seems light, and correspondingly dark in the places where there is an electric field. If the liquid crystal layer twists the light for 270°, the polarizers are selected in such a way that the polarization level of second polarizer 9 is at an 270° angle to the polarization level of first polarizer 1. Reasonably small (e.g. the ones used in Nokia 9000 Communicator) black/white displays are often of the so called super twisted nematic (STN, Super Twisted Nematic) type, in which the twist angle usually is 270°.

Correspondingly the first layer of display D2 is, when counted from the viewing direction, first polarizer 1", or polarization filter 1". On the same level in the construction there is for display D1 second polarizer 9', or polarization filter 9', and reflector 10' of display D1. Also layers 1" and 9', 10' both are 0.3–0.35 mm thick and they are equally in practice separate pieces which are placed/fixed next to each other on the same level on the surface of a glass plate. In this way a double sided display element is formed, by the use of which it is obtained smaller display D1 (telephone part display) viewed from top in FIG. 3 and larger display D2 (computer/organizer part display) viewed from downside, which thus are situated next to each other and they display information to opposite directions. The thickness of a display construction formed in this way will be, using above dimensions, ca. 2.0 mm.

In addition to above, it is possible to mount in displays D1 and D2 farthest in the viewing direction electroluminescent background light layer 16' and correspondingly 16", if a background light is used and the construction of the background light is desired to be as thin as possible. The electroluminescent, or EL -background light layer can be formed out of laminated plastics, containing phosphorus between layers, which becomes illuminated when a voltage is connected over it. The voltage for the background light layer can be obtained from the display power supply or elsewhere in the device in which the display is mounted. An EL -background light requires high voltage (approximately 200 V) and thus normally requires a separate driver circuit.

A display element according to the invention is preferably not fixed to any circuit board, but driver circuits Dr of the display can be fixed directly on glass plate 2"/8" of the display, using for example the chip-on-glass technique. This can be done in such a way that one longitudinal and one transverse edge of bottom glass plate 2"/8" in the figure is slightly longer than the upper glass plate in the figure, hence on the edges of the bottom 2"/8" glass plate there is room for mounting the driver circuits. Electrodes 3 and 7 of transparent conductive material, which have not been shown in detail in the figure, consist of transverse and longitudinal conductors, in the crossing points of which the pixels of the display form. The electrodes are controlled using driver circuits Dr, hence it is possible to make desired pixels light or dark and in such a way a desired figure can be formed in the display. No separate driver circuits are required for displays D1 and D2, but the same driver circuits Dr which control the whole display area of glass plates 2 and 8 using the longitudinal and transverse conductors, are capable of controlling the electrodes in the area of display D1 and display D2. It is also possible to use separate driver circuits for displays D1 and D2, even if both displays consist of the same glass- and electrode plates. By arranging own driver circuits for the displays it is possible to make the power consumption of smaller display D1 lower, but this makes the construction more complex because more driver circuits are needed.

Figure 4A:
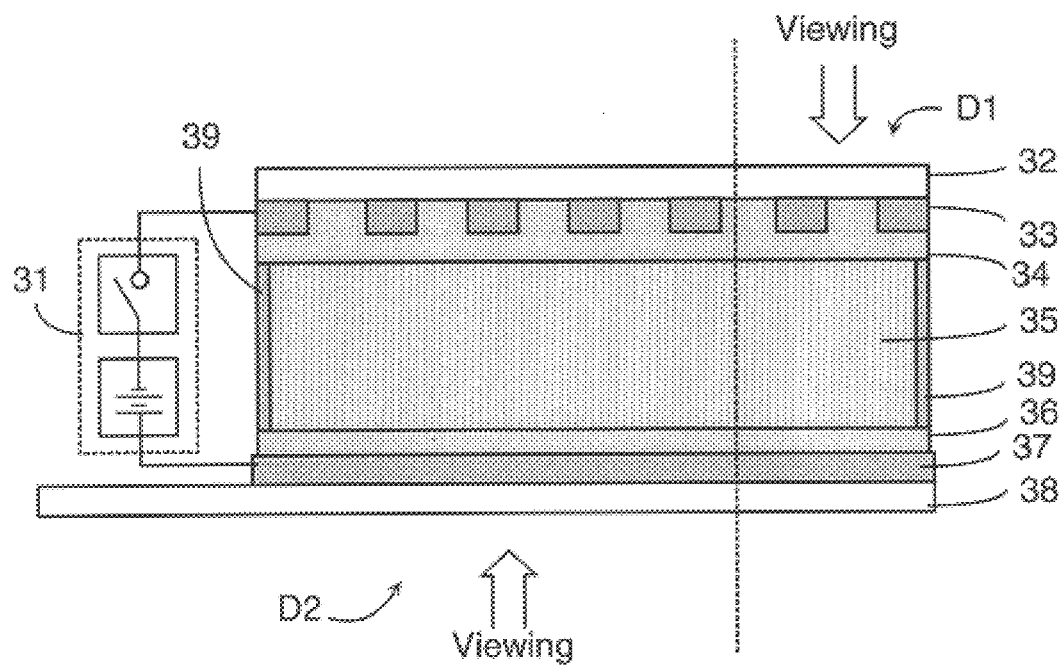
FIG. 4a presents an example of the realization of a display element according to the invention as a plasma display.
Figure 4B:
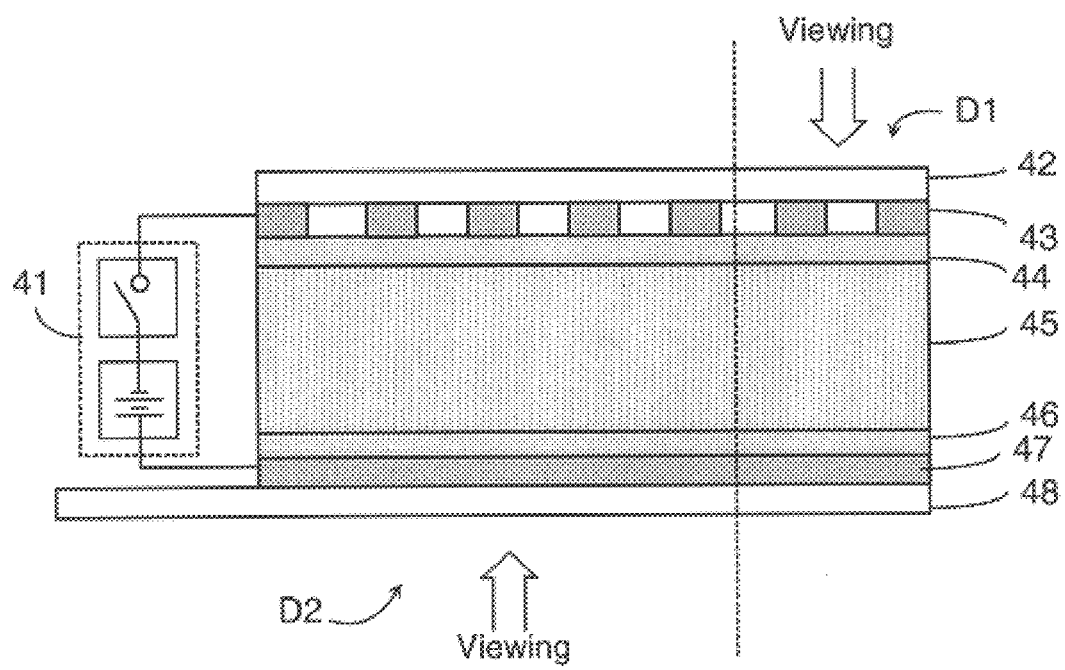
FIG. 4b presents an example of the realization of a display element according to the invention as an electroluminescence display.

In order to fasten it, it is possible to mount a display in housing 17, which can be for example of rigid plastics. It is further possible to install lens 18 on top of each display D1, D2 to protect the display. The lens in not necessary. The size of the housing included, the size of an encapsulated display construction will come to approximately 5.4 mm, which is less than a half of the present. FIGS. 4a and 4b present a corresponding realization using plasma- or electroluminescence display. FIG. 4a presents the structure of a plasma display for the realization of a display element according to the present invention. A plasma display normally has on top and in the bottom glass layers 32 and 38. After the glass plates come electrodes 33 and 37, of which the one closer to a viewer has usually been made transparent, for example by using indiumtinoxide (ITO). It has also been possible to use thin metal conductors because light emission spreads sideways in such a way that light is emitted. In a display element according to the invention both electrodes 33 and 37 are preferably realized using transparent conductors. Alternatively, it is possible to use a reversed construction in one part of the structure in such a way that for display D1 electrodes 33 are made of a transparent material and electrodes 37 of metal, and for display D2 electrodes 37 are made of a transparent material and electrodes 33 are made of metal. The electrodes are normally surrounded by an isolating layer 34, 36, between which there is gas layer 35. Also in the ends of the gas layer there is isolating layer 39, which can be of the same material as layers 34 and 36 (for example isolating solder-glass). With display driver circuits 31 a voltage is directed to the desired pixel, hence a gas discharge takes place in gas 35, i.e. light is emitted, which is seen as the activation of the pixel in question. Using driver circuits 31 a voltage is connected over electrodes 33 and 37 in such a way that for display D1 the light is seen upwards in FIG. 4a, and for display D2 the light is seen downwards in FIG. 4a (a reversed, negative voltage compared with the voltage over the electrodes of display D1). The vertical dashed line in the figure illustrates the realization of two displays D1 and D2 displaying to two different directions. The display areas can be divided more clearly using suitable encapsulating, with which the other areas are covered, but apertures are left for the viewing of displays D1 and D2. Longer glass plate 38 shown in the figure illustrates how, as in FIG. 3, by arranging one glass plate to be longer than the other one, driver circuits 31 can be placed on the edges using for example the chip-on-glass technique.

FIG. 4b presents the structure of an electroluminescence display for the realization of a display element according to the present invention. An electroluminescence display normally has on top, closest to a viewer a glass layer and on the bottom a protective layer. Both topmost layer 42 and bottom layer 48 in an electroluminescence display according to the invention and in the figure are preferably glass plates. After the glass plates come electrodes 43 and 47, of which normally the one closer to a viewer has been made transparent, for example by using indiumtinoxide (ITO) and the second electrode has been made for example of aluminium. In a display element according to the invention both electrodes 43 and 47 are preferably realized using transparent conductors. Alternatively, a reversed construction is used in one part of the construction in such a way that for display D1 electrodes 43 are made of a transparent material and electrodes 47 of aluminium or of some other metal, and for display D2 electrodes 47 consist of a transparent material and electrodes 43 of aluminium or of some other metal. The electrodes are normally surrounded by an isolating layer 44, 46, for example of $Y_2O_3$, $SiO_2$ and $Al_2O_3$, between which there is electroluminescence film 45, which can be formed of powder or using the thin film technique. Material 45 is a semiconductor compound, usually for example ZnS with Mn as a compound blend. With display driver circuits 41 a voltage is directed to the desired pixel, hence electroluminescence film 45 emits light at the pixel in question. With driver circuits 41 the voltage is directed over electrodes 43 and 47 in such a way that for display D1 the light is directed upwards in FIG. 4b and for display D2 the light is seen downwards in FIG. 4b (a reversed, negative voltage compared with the voltage over the electrodes of display D1). The vertical dashed line in the figure illustrates the realization of two displays D1 and D2 displaying to two different directions. The display areas can be divided more clearly using suitable encapsulating, with which the other areas are covered, but apertures are left for the viewing of displays D1 and D2. Longer glass plate 48 shown in the figure illustrates how, as in FIG. 3, by arranging one glass plate to be longer than the other one, driver circuits 41 can be placed on the edges using for example the chip-on-glass technique.

Figure 5A:
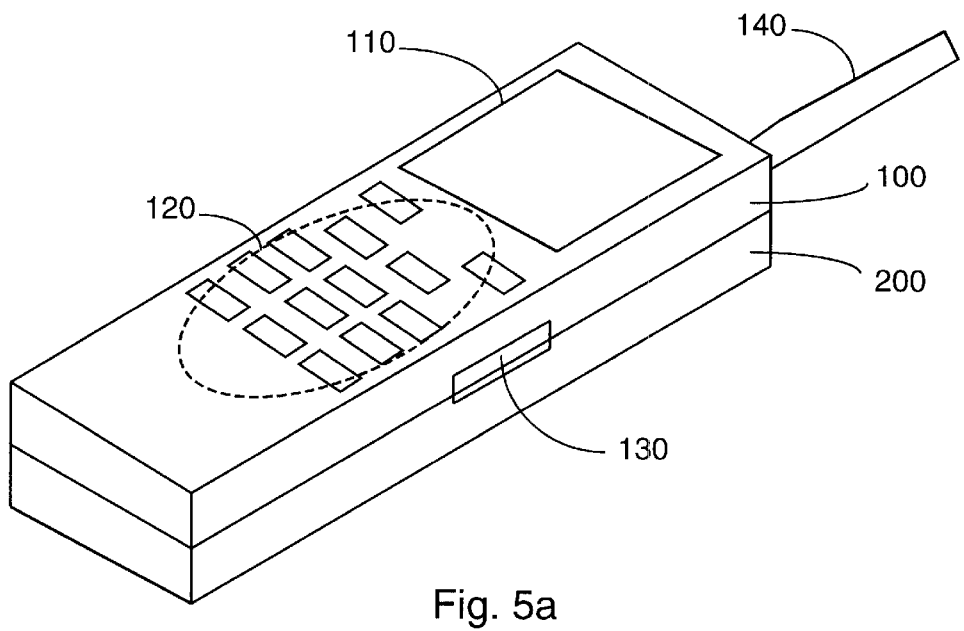
FIG. 5a presents a terminal device according to the invention with the lid closed (mobile telephone position)
Figure 5B:
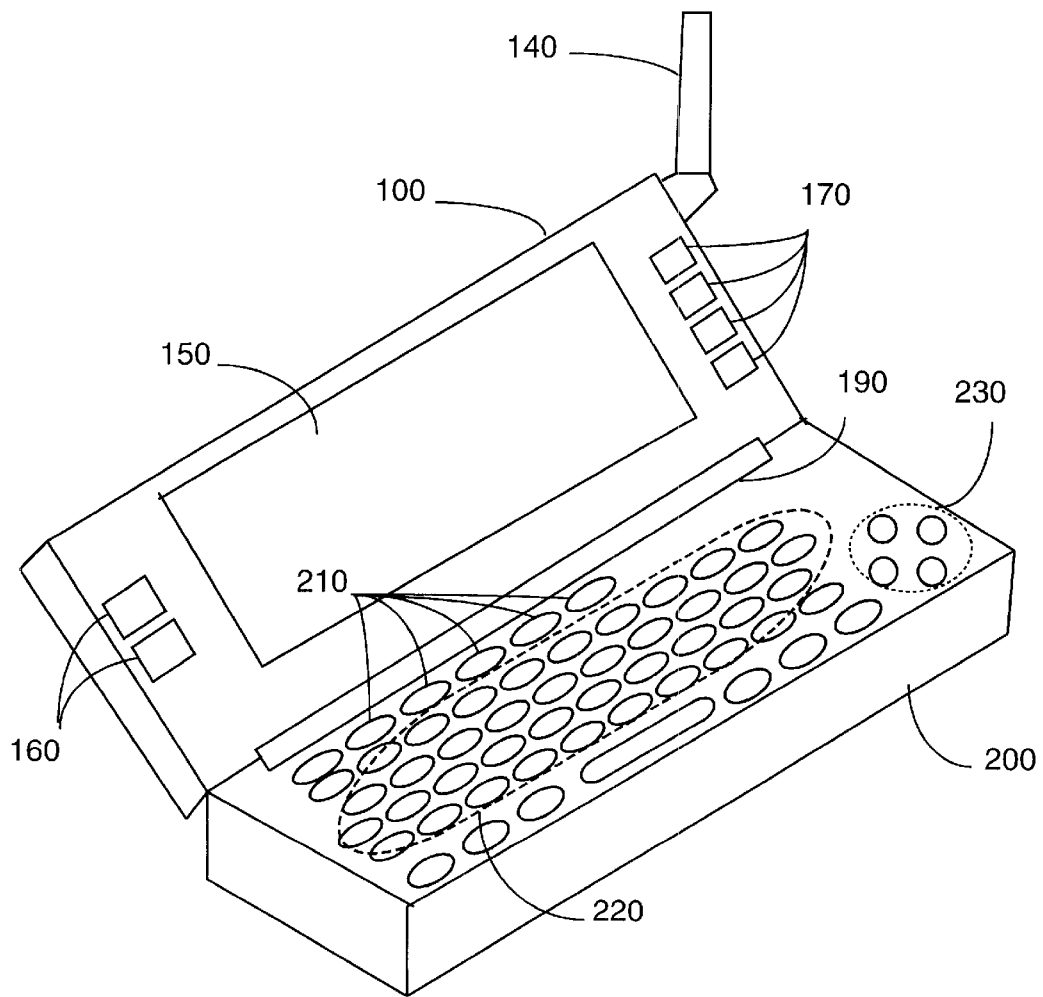
FIG. 5b presents a terminal device according to the invention with the lid open (computer/organizer position).

FIGS. 5a and 5b present a telecommunication device utilizing a display element according to the invention, Nokia 9000 Communicator -terminal device, known as one, which is a multiservice mobile station with two sections. Thus the invention is also related to a terminal device comprising a two-way display element, which device can be made thinner compared with prior known devices. FIGS. 5a and 5b present an example of such a terminal device. A multiservice mobile station can be used in two different positions, the first of which shown in FIG. 5a, the mobile telephone position, has been optimized for the using of the terminal device mainly like a conventional mobile telephone. The second position, the terminal device position shown in FIG. 5b, has been optimized for the using of the terminal device as a versatile organizer and as a telecommunication terminal device.

The terminal device is in FIG. 5a shown in the mobile telephone position, when lid section 100 and base section 200 have been folded at a suitable angle against each other supported by hinge 190 (FIG. 5b). In FIG. 5a the top side of lid section 100 comprises display 110 for displaying alphanumeric characters or graphic figures, i.e. display D1 according to the invention, and keyboard 120 for entering alphanumeric characters in the terminal device. Now a user has access to the telephone section of the device and display 110 has been arranged to display information connected with the telephone function, such as dialing a telephone number, the identification of an incoming call, and the scrolling of telephone function menus and other corresponding functions connected with a wireless telephone. When the terminal device is in the mobile telephone position lid section 100 and base section 200 are locked to each other with latch 130. Movable antenna 140 is in a first embodiment according to the invention fixed to lid section 100.

In FIG. 5b the terminal device is presented in the terminal device position, when lid section 100 and base section 200 have been folded in a suitable angle apart from each other supported by hinge 190. Now the inside of lid section 100 and the top side of base section 200 provide a user with an user interface comprising display 150, i.e. display D2 of a display element according to the invention, scroll keys 160 and command keys 170, and base section 200 provides application keys 210, QWERTY-keys 220 prior known from computers and cursor keys 230. The user now has at his or her disposal the computer section or the so called organizer section (using which also calls can be made), and display 150 has been arranged to display information connected with the organizer function, such as a calendar, contact memo, electric mail and other corresponding functions connected with the organizer and the multiservice mobile station. The display element is fixed to the lid section for example alike in FIG. 3 to housing 17.

The above is a description of the realization of the invention and its embodiments utilizing examples. It is self evident to persons skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

It is equally possible in the presented way to form several displays, for example three displays, in such a way that two displays display in the same direction and the third display to the opposite direction.

What is claimed is:

1. A display arrangement displaying fixedly to two different directions, comprising a first display displaying to a first direction and a second display displaying to a second direction, said second display being fixed in relation to said first display thus displaying fixedly in an essentially opposite direction to said first direction, wherein the display arrangement comprises a component common to said first and second display, which component comprises a display material layer of a certain size which determines the type of the display, and a first part of said display material layer forms a part of said first display and a second part of said display material layer forms a part of said second display, and the display arrangement further comprises driver circuits for controlling said first display to display a first information and said second display to display a second information that is different from said first information.

2. A display arrangement according to claim 1, wherein said display material layer comprises all such layers of the display, the location of which within the display is independent of the direction of viewing.

3. A display arrangement according to claim 1,
wherein the display arrangement further comprises glass plate layers of a certain size enveloping the display material layer on both sides, which glass plate layers are common for said first and second displays and a first part of said glass plate layers forms a part of said first display and a second part of said display material layers forms a part of said second display.

4. A display arrangement according to claim 1, wherein it further comprises layers the order and direction of which in the arrangement is dependent on the viewing direction of the display, and such layers have in the area of the first display been placed in a first order and in a first direction and in the area of the second display in the opposite order and direction compared with the first display.

5. A display arrangement according to claim 4, wherein it comprises in the first part and in the second part of the display on both sides of the display material layer a first and a second layer dependent on the direction of viewing, and the first layer, dependent on the direction of viewing of the first display has been placed in a certain first order and direction in the part of the first display in the arrangement and the second layer, dependent on the direction of viewing, of the first display has been placed in a certain second order and direction in the arrangement in the part of the first display, and the corresponding first layer, dependent on the direction of viewing, of the second display has been placed in order on the same layer with the second layer, dependent on the direction of viewing, of the first display and in the opposite direction to the first layer, dependent on the direction of viewing, of the first display in the part of the second display and the corresponding second layer, dependent on the direction of viewing, of the second display has been placed in order on the same layer with the first layer, dependent on the direction of viewing, of the first display and in the opposite direction to the second layer, dependent on the direction of viewing, in the part of second display.

6. A display arrangement according to claim 1, wherein said common display material layer comprises the liquid crystal layer of the liquid crystal display, electrode layers and glass plate layers formed on both sides of it.

7. A display arrangement according to claim 5, wherein said first layer, dependent on the direction of viewing, is a first polarization layer counted from the direction of viewing of the liquid crystal display and said second layer, dependent on the direction of viewing, is a second polarization layer counted from the direction of viewing the liquid crystal display.

8. A display arrangement according to claim 7, wherein said second polarization layer also comprises a reflector layer of the liquid crystal display.

9. A terminal device comprising
a first user interface for using a first function, which first user interface comprises a first display displaying in a first direction, and
a second user interface for using a second function which second user interface comprises a second display displaying in a second direction, said second display being fixed in relation to said first display in order to display fixedly in an essentially opposite direction to the first display, wherein the terminal device comprises a component common to said first and second displays, which component comprises a display material layer of a certain size which determines the type of the display, and a first part of said display material layer forms a part of said first display and a second part of said display material layer forms a part of said second display, and the terminal device further comprises driver circuits for controlling said first display to display information in relation to said first function and said second display to display information in relation to said second function.

10. A terminal device according to claim 9, wherein it is a communication device comprising telephone- and organizer functions, said first and second display form one compact construction placed inside the same housing of the device, and said first display has been arranged to display information connected with the telephone function and said second display has been arranged to display information connected with the organizer function.

11. A display arrangement according to claim 1, wherein said first display is smaller than said second display, the use of said first display resulting in a smaller power consumption than the use of said second display.

12. A display arrangement according to claim 1, wherein the display arrangement comprises common driver circuits for said first and second display.

13. A display arrangement according to claim 1, wherein the display arrangement comprises separate driver circuits for said first and second display.

14. A terminal device according to claim 9, wherein said first display is smaller than said second display, the use of said first display resulting in a smaller power consumption than the use of said second display.

15. A terminal device according to claim 1, wherein the display arrangement comprises common driver circuits for said first and second display.

16. A terminal device according to claim 1, wherein the display arrangement comprises separate driver circuits for said first and second display.

17. A display arrangement according to claim 1, wherein the display material layer is a flat layer of display material having a total area in size, and said first part of the display material layer is a first area of the total area and less than the total area, and said second part of the display material layer is a second area of the total area but different from the first area and less than the total area.

18. A display arrangement according to claim 17, wherein said first area is substantially the viewing area of the first display, said second area is substantially the viewing area of the second display, and said first area is bigger than said second area.

19. A terminal device according to claim 9, wherein the display material layer is a flat layer of display material having a total area in size, and said first part of the display material layer is a first area of the total area and less than the total area, and said second part of the display material layer is a second area of the total area but different from the first area and less than the total area.

20. A terminal device according to claim 19, wherein said first area is substantially the viewing area of the first display, said second area is substantially the viewing area of the second display, and said first area is bigger than said second area.

21. A display arrangement according to claim 1, wherein the first and second displays are non-overlapping.

22. A terminal device according to claim 9, wherein the first and second displays are non-overlapping.

* * * * *